W. H. PRESCOTT.
SLICING UTENSIL.
APPLICATION FILED JAN. 21, 1922.
1,436,906.
Patented Nov. 28, 1922.
2 SHEETS—SHEET 1.
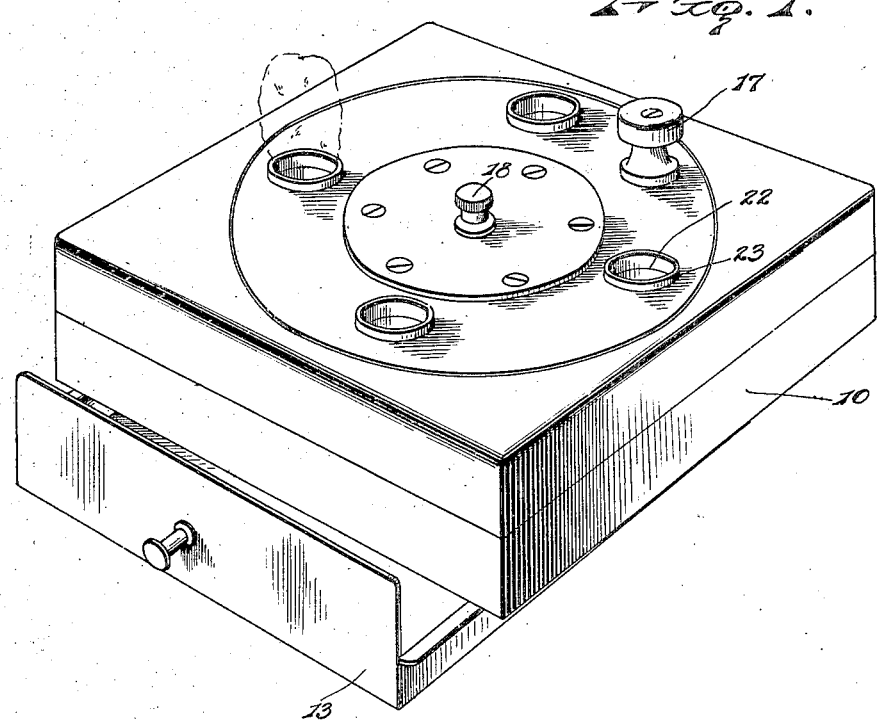
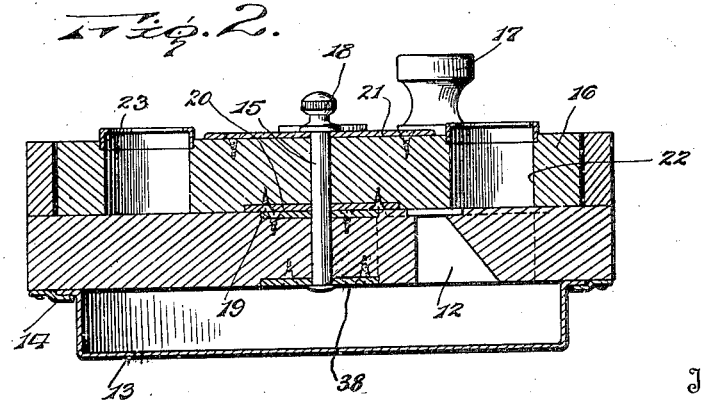
Inventor
W. H. Prescott.
By
Lacey & Lacey, Attorneys

W. H. PRESCOTT.
SLICING UTENSIL.
APPLICATION FILED JAN. 21, 1922.

1,436,906.

Patented Nov. 28, 1922.
2 SHEETS—SHEET 2.

Inventor
W. H. Prescott.

By
Lacey & Lacey, Attorneys

Patented Nov. 28, 1922.

1,436,906

UNITED STATES PATENT OFFICE.

WILLIAM H. PRESCOTT, OF ABERDEEN, WASHINGTON.

SLICING UTENSIL.

Application filed January 21, 1922. Serial No. 530,842.

*To all whom it may concern:*

Be it known that I, WILLIAM H. PRESCOTT, a citizen of the United States, residing at Aberdeen, in the county of Grays Harbor and State of Washington, have invented certain new and useful Improvements in Slicing Utensils, of which the following is a specification.

My invention relates to an implement for use in the kitchen to slice vegetables and fruit. One object of the invention is to provide an implement of this kind with suitable adjustment for feeding the fruit to the knives to cut thin or thick slices as desired. This is a great advantage, as it is extremely difficult to cut an apple, potato, or onion in uniform slices by hand, and it will be appreciated that a dish looks considerably more appetizing when served with regularly shaped pieces of fruit than if the pieces are of all kinds of shapes and sizes.

Another advantage resides in the fact that there will be hardly any waste, when my implement is used because all cuttings as well as the juice from the fruit are gathered in the receptacle attached to the implement. It also constitutes a great time saver. For small households, it is constructed to be hand operated, but for hotels and restaurants it is equipped to be motor-driven.

One embodiment of the invention is illustrated in the accompanying drawings.

Figure 1 is a perspective view of the device assembled;

Figure 2 is a central transverse section;

Figure 3:
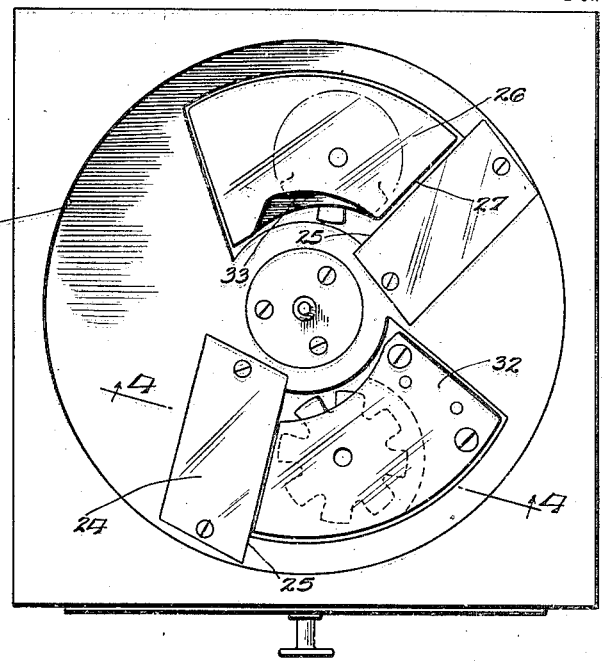
Figure 3 is a top plan view with the feeding wheel removed.
Figure 4:
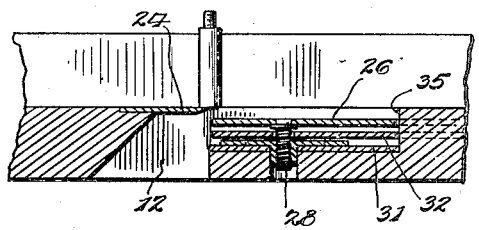
Figure 4 is a section on the line 4—4 of Fig. 3.
Figure 5:
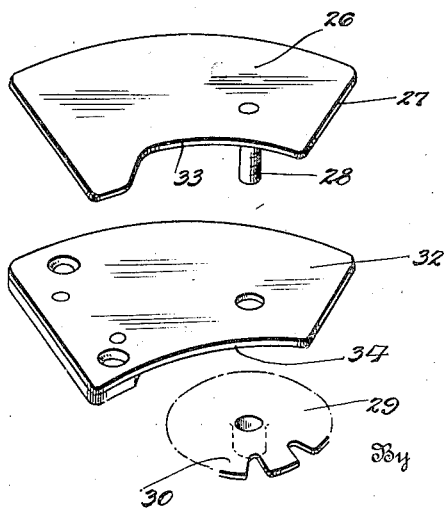
Figure 5 is a perspective view of the adjustable feeding members.

The device consists of a casing 10 which may be made of wood or metal and has a cylindrical recess 11 provided in its top part and a number of apertures 12 leading from the recess through the bottom of the casing. On the under side of the casing is fitted a receptacle 13 carried in suitable guides 14 under the bottom of the casing so that it may be removed when filled.

In the center of the casing is rigidly secured a pivot pin 15, which extends upwardly through the cylindrical recess 11 and upon which a wheel 16 is mounted so as to be revoluble in the casing. The wheel has for this purpose a small handle 17 on top thereof. Instead of a handle, this wheel may be provided with suitable gearing for connecting with a small motor to drive the wheel. The wheel is held in position by means of a small thumb nut 18 threaded on the end of the pivot pin 15. In case the wheel 16 and the casing 10 are made of wood, the pivot pin 15 is held in position and properly guided by a number of plates 38, 19, 20 and 21 rigidly secured in the casing and the wheel.

The wheel 16 is provided with a number of apertures 22 equally spaced around its axis and running straight up and down through the wheel. These apertures are preferably lined by means of small guides 23 at the upper end.

The apertures 12 in the casing are positioned to register with the apertures 22 in the wheel periodically during the revolution of the wheel 16 and adjacent to each of the apertures 12 in the bottom of the recess 11 are placed knives 24 with their edges preferably extending radially across the bottom of the recess. The apertures 12 and the knives 24, which may be fewer or greater in number than the apertures 22 in the wheel, are now so positioned with relation to the latter that only one of the wheel apertures 22 registers with one of the knives at a time, or in other words, that only one knife is operating while the others are idle.

In a recess 35, which is situated opposite to the radial edge 25 of each knife is set a guide plate 26 having a straight edge 27 facing the knife edge 25. This guide plate 26, which has the same contour as the recess, has on its under side a threaded shank 28 which is adapted to engage with a correspondingly threaded nut 29 having a large head with a fingered edge 30 for adjusting the position up and down of the guide plate 26 with regard to the knife 24. The threaded portion of the nut 29 is guided by means of a pair of securing plates 31, 32 which are rigidly secured in the casing and the fingered portion 30 of the nut 29 rests between these two plates 31, 32. Both the guide plate 26 and the top securing plate 32 are cut away on their inner sides, 33, 34, to permit a small tool to be entered from the upper side of the casing, when the wheel has been removed, to turn the fingered head 30 of the nut 29 and thereby adjust the guide 26 with regard to the knife edge and by this means adjusting the thickness of the slices to be cut.

The use of the device is as follows: After the guide plates 26 have been adjusted to the desired thickness of the slices, the wheel 16 is placed in its position in the recess 11 and the nut 18 tightened. The fruit is now deposited in the apertures 22 and the wheel revolved by means of the handle 17 or a suitable motor, when the cut slices will drop through the apertures 12 into the receptacle 13 which, after the cutting has been completed, is removed containing both the sliced fruit and the juice from the same.

Having thus described the invention, what is claimed as new is:

1. A slicing utensil comprising a casing having a cylindrical recess, a revoluble member fitting within said recess, said member having apertures adapted to register periodically during its revolution with apertures provided in said casing, knives secured in the casing adjacent its apertures and adjustable guide plates at the knife edges.

2. A slicing utensil comprising a casing having a cylindrical recess, a revoluble member fitting within said recess, said member having apertures adapted to register periodically during its revolution with apertures provided in said casing, knives secured in the casing adjacent its apertures, guide plates, and means for adjusting the position of each guide plate with regard to the corresponding knife edge.

3. A slicing utensil comprising a casing having a cylindrical recess, a revoluble member fitting within said recess, said member having apertures adapted to register periodically during its revolution with apertures provided in said casing, knives secured in the casing adjacent its apertures, guide plates, and means for adjusting the position of each guide plate with regard to the corresponding knife edge, said means including a threaded shank on each guide plate, and a nut engaging said shank and provided with suitable bearing.

4. A slicing utensil comprising a casing having a cylindrical recess, a revoluble member fitting within said recess, said member having apertures adapted to register periodically during its revolution with apertures provided in said casing, knives secured in the casing adjacent its apertures, guide plates, means for adjusting the position of each guide plate with regard to the corresponding knife edge, said means including a threaded shank on each guide plate, a nut engaging said shank and provided with a suitable bearing, and a receptacle under the apertures in said casing.

In testimony whereof I affix my signature.

WILLIAM H. PRESCOTT. [L. S.]